Oct. 25, 1955

O. SCALISE 2,721,802

BAKING SPECIALTY MADE FROM FOODSTUFFS
CONTAINING CARBOHYDRATES AND PROTEINS
AND PROCESS OF MAKING THE SAME

Filed April 20, 1953

INVENTOR.
ORESTE SCALISE
BY
ATTORNEY

United States Patent Office 2,721,802
Patented Oct. 25, 1955

2,721,802

BAKING SPECIALTY MADE FROM FOODSTUFFS CONTAINING CARBOHYDRATES AND PROTEINS AND PROCESS OF MAKING THE SAME

Oreste Scalise, New York, N. Y.

Application April 20, 1953, Serial No. 349,581

18 Claims. (Cl. 99—93)

The present invention relates to the art of baking specialties, and, more particularly, to an improved baking specialty comprising derivatives of foodstuffs to be added to a dough to act as a bread improver and softener, a moisture absorber and retainer, a staling retarder, and a yeast food.

It is well known that heretofore the art has used a variety of baking specialties to be added to dough for various purposes. Thus, calcium and sodium propionate or sodium di-acetate have been and still are added to dough as mold retarders. A mixture containing potassium bromate, calcium sulfate, ammonium chloride, sodium chloride and a flour filler have been and still are used as a yeast food and dough conditioner. Other compounds performed the same function and included oxidizing agents, such as potassium bromate or iodate, and ammonium persulfate. Mono and di-glycerides functioned as emulsifiers and bread softeners. Mono-calcium phosphate has been and still is added to the dough to act as a dough and water conditioner. It is to be observed that practically all of these prior products are chemical compounds or foreign agents and are not flour or cereal derivatives. Although attempts have been made to replace these prior chemical products and foreign agents, none, as far as I am aware, has been entirely successful when carried into practice commercially on an industrial scale.

It has now been discovered that certain edible materials containing both carbohydrate and protein can be treated with critically small amounts of special colorless or water white, non-toxic, non-oxidizing, and ionizable acids in such a way with live steam as to go beyond the stage of the threshold hydrolysis to disintegrate the starch and depolymerize the protein components of such materials to provide a base from which an improved baking specialty can be made.

It is an object of the present invention to provide an improved baking specialty capable of acting in a dough to beneficially affect the texture and grain of the finished baked goods.

Another object of the invention is to provide an improved baking specialty capable of assisting in the acceleration of yeast action in the dough to stimulate fermentation.

It is a further object of the invention to provide an improved baking specialty capable of absorbing and retaining moisture whereby the baked loaf of bread is less dry and is fresher and for other reasons whereby the keeping quality of the bread is extended.

Other objects and advantages will become apparent from the following description taken in conjunction with the accompanying drawings, in which.

Figure 1:
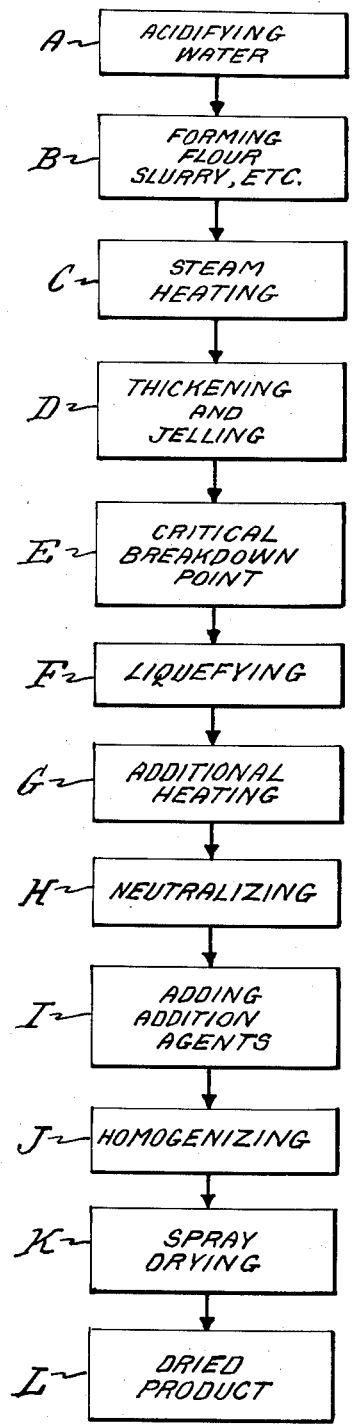
Fig. 1 is a flow sheet of a process for carrying the present invention into practice.

Broadly stated, the present invention contemplates mixing flour or meal of a foodstuff containing both carbohydrate and protein or a mixture of the starchy and leguminous foodstuff to provide both starch and protein elements with specially acidified water to form a slurry, a thin batter or dough. It is preferred to use as an acid, a substantially colorless or water white acid which is non-toxic, which is non-oxidizing, which is ionizable, which does not discolor the foodstuffs under treatment, and which yields by-products that are edible or non-harmful. The aforesaid acid is one of the group consisting of hydrochloric acid, sulfuric acid and phosphoric acid or mixtures thereof. The acidified slurry, batter or dough is heated to first thicken or jell it and then to carry it to the critical breaking or breakdown point and finally liquefying it. In carrying out this heating operation, live steam is employed to heat the slurry, etc., to a temperature of 212° F. or above, say about 215° F. (atmospheric pressure) and about 220° to about 260° F. (under pressure). The time required to convert the slurry, etc., to a liquefied state varies, depending upon temperature, rate of heating, type of converter, kind of mixing, etc., as those skilled in the art will readily appreciate. In certain instances, the converted mass can be subjected to additional heating until such additional treatment or conversion has been effected as desired in any particular case. After conversion, the liquefied mass of acid character is treated with a neutralizing agent to reduce the acidity thereof and to adjust the pH within a range of about 5 to 7. When the pH has been adjusted, the mass can be dried in any suitable manner, such as spray drying to produce a dried product, preferably in the form of a powder which can be used as a baking specialty. Before drying, it is sometimes preferred to add addition agents to the aforesaid liquefied mass and to subject this mass to a mixing or homogenizing operation. Such an operation has a tendency to make the mass substantially uniform and facilitates dispersion and drying in a spray dryer.

The improved process for carrying the present invention into practice involves the use of certain types of foodstuffs as raw materials. These foodstuffs contain not only carbohydrates but also protein and embrace such cereals, as wheat, corn, rye, barley, etc., or they may be mixtures of such protein foodstuffs as legumes such as navy beans, peas, lentils, soya beans, etc., with starchy foodstuffs such as roots or tubers as sweet potato, white potato, taro sago, manioca, tapioca, etc., or such mixtures of the foregoing as to provide both protein and starch. In converting these foodstuffs into baking specialties, acidulated water is employed which has been acidified with a substantially colorless or water white acid which is non-toxic, which is ionizable, which does not discolor the foodstuffs under treatment and which yields by-products that are edible or non-harmful. Such acids embrace hydrochloric acid (HCl), sulfuric acid ($H_2SO_4$) and phosphoric acid ($H_3PO_4$) and mixtures thereof which are chemically pure.

Referring to Fig. 1, it will be noted that the first operation "A" is acidifying water with a very small amount of the specially selected acid. Ordinarily, less than 5% by weight of the concentrated acid is used, but preferably about 1% of the weight of the water used to make the solution is employed. For best results, about 1% to about 2% of acid is used.

After acidifying the water, the second operation "B" involves forming a slurry, thin batter or thin dough with the ground foodstuffs, either in the form of flour or meal. Such a slurry, batter, dough, etc., is subjected to a heating operation "C" which is live steam heating through an open coil, which not only heats the slurry, batter, dough, etc., but also subjects it to turbulence and turbulent mixing.

By controlled heating to specially selected temperatures, a thickening and jelling operation "D" can be effected. When open kettles, converters, or tanks are used, the slurry, etc., can be seen to thicken and jell. Continuing the heating, the breaking or breakdown operation "E" is next involved and the thickened and jelled slurry, mass, etc., reaches the critical breakdown point. This is an important point in the novel process as it is a critical indication to those skilled in the art that the thickened and jelled slurry, mass, etc., will now be liquefied in the liquefying operation "F." Such liquefied material or mass can be used for subsequent operations, but additional heating "G" is preferably employed. The operation of additional heating can be continued until such additional conversion has been effected as desired in any particular case.

The heated and liquefied mass is acid in character and must be subjected to a neutralizing operation "H." It is preferable to adjust the pH of the mass and to bring it to a range just below a pH of 7.0. In practice, it is preferred to adjust the pH within a range between about 5.5 to 7.0. In effecting the aforesaid neutralizing operation, a careful selection of neutralizing agents, such as alkaline products must be made. As it is essential that no toxic or harmful by-products be produced but only non-toxic, inert, or non-deleterious by-products be produced, it has been found that chemically pure alkaline products, such as ammonium, sodium, and potassium hydroxide, carbonate and bicarbonate can be used as well as calcium oxide, hydroxide or carbonate. In these instances, yeast foods, such as phosphates, chlorides, ammonium salts, calcium sulfate, etc., are formed which are beneficial to baking operations. The alkalizing agent can be used in dry powdered form but is generally added as a solution or slurry with water. By adding appropriate amounts of the alkaline agent, the acidity can be adjusted to a desired point. Generally, a pH within a range of about 5 to 7 is preferred.

In the event that it is desired, the operation "I" of adding addition agents to the neutralized mass can be employed. Such addition agents may embrace a variety of materials. For illustration, yeast foods, such as the phosphates, chlorides, nitrates of ammonia, potassium bromates or iodates, calcium sulfate, mono-calcium phosphate, etc., can be added. Other agents may include lecithin, mono and diglycerides, etc., as those skilled in the art will readily understand.

Before drying, the neutralized mass is preferably subjected to a homogenizing operation "J," particularly where it is in the condition of a dough or batter in an appropriate mixing machine, such as a colloidal mill, votator, or viscolizer which will produce a substantially uniform product. Such a product can then be dried, preferably in a spray drying operation "K." In carrying this operation into practice on an industrial scale, it has been found that satisfactory results were obtained with a rotary disc-type of spray dryer. The dried product "L" can be packed, shipped, stored, handled, and used like any other baking specialty in the manufacture of baked goods, particularly bread, rolls, etc.

Tests have revealed that the new baking specialty possesses the following properties and characteristics: Added to dough, the time of fermentation is decreased, and the gluten is mellowed or softened, particularly in the case of hard or tough gluten flours. A yeast food is furnished for multiplication and growth of yeast cells, thus increasing aeration of the dough during the fermentation, accelerating gas production and superior gas retention. Emulsification and dispersion of shortening is effected. In the baked goods, improvements in palatability and in the texture and grain are effected. Moisture is retained and aids in keeps the baked goods soft and edible for a longer period of time than normal.

Figure 2:
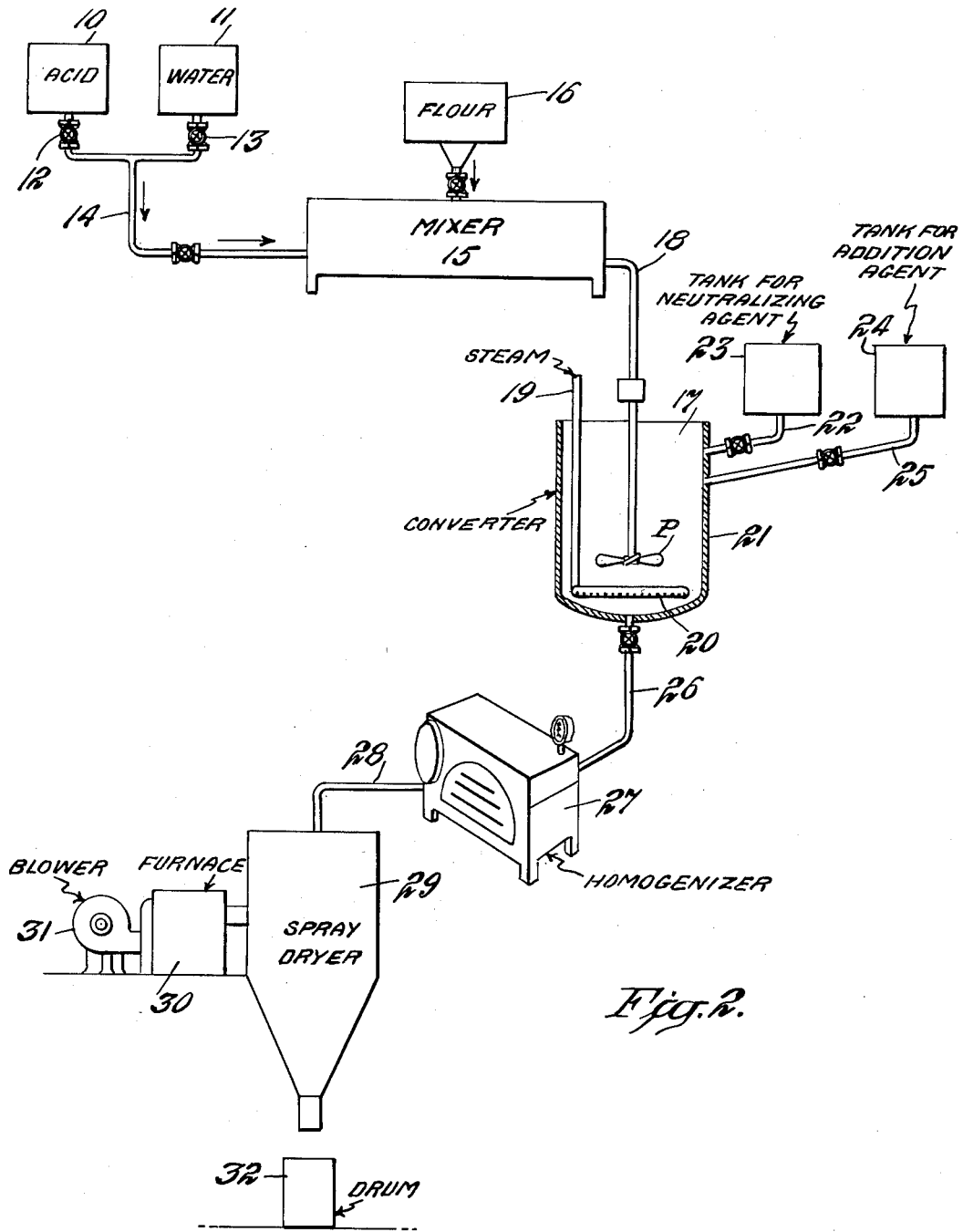
Fig. 2 depicts diagrammatically a schematic view of an arrangement of equipment capable of carrying the invention into practice commercially on an industrial scale.

In practical operations, it has been found that the present invention can be carried into practice with the equipment illustrated diagrammatically in Fig. 2. For instance, acid can be stored in a reservoir, storage container or tank 10 from which it can be discharged in controlled amounts. Similarly, water can be obtained from tank 11 or directly from a tap or faucet connected to a city water supply, etc. Pipe 12 can carry the acid from its tank 10 and pipe 13 can convey the water from its tank 11. The acid and water can be mixed in a suitable tank or device (not shown) or in a connecting pipe 14 which will conduct the acidified water to a mixer 15. Flour from a supply container 16 is fed into the mixer in controlled amounts for mixing with acidified water to form a mixture.

A converter 17 is connected to the mixer via a suitable conduit 18 to enable the mixture to be transferred thereto for treatment. Within the converter, a stirrer P is mounted in a well known manner for mixing or agitating the mixture. To heat the converter, steam is introduced via pipe 19 to the open or perforated coils 20. Surrounding the converter is a jacket 21 to enable the mixture within the converter to be cooled. Connected to the converter via pipe 22 is tank 23 for a neutralizing agent. Similarly, a tank 24 for addition agents is connected to the converter via pipe 25.

From the converter, the treated and neutralized material is conducted via conduit 26 to a mixing machine, such as a homogenizer, viscolizer, or votator colloid mill 27. The mixed or homogenized product is piped via pipe 28 to a spray dryer 29 which is provided with a furnace 30 and attached blower 31. The spray dried product is discharged into a drum 32 or other packing container or device.

Figure 3:
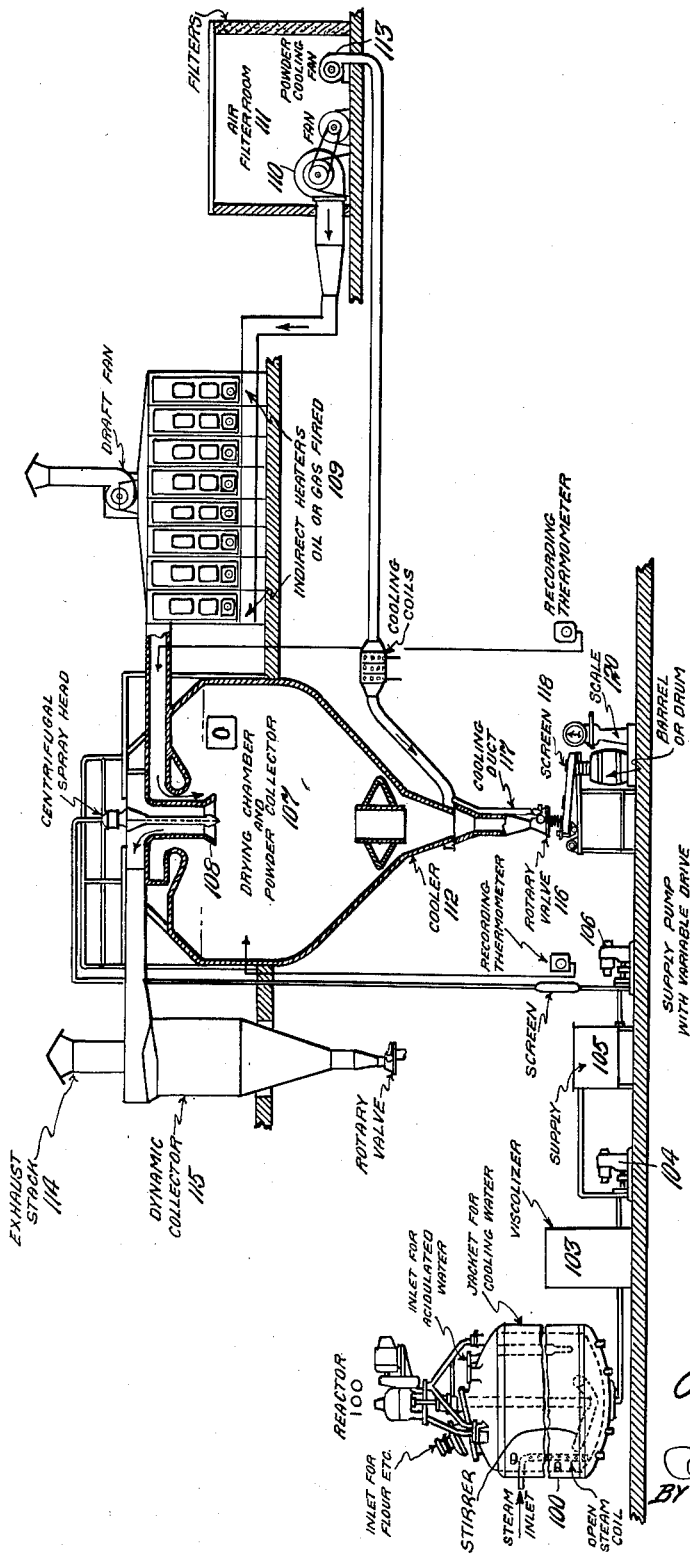
Fig. 3 illustrates diagrammatically a preferred embodiment of equipment for carrying the invention into practice on a plant scale.

When carrying thhe invention into practice on an industrial scale for the production of commercial products, it is preferred to use the equipment illustrated diagrammatically in Fig. 3. The acidulated water is added to a jacketed reactor 100 or the acid and water can be added separately. When added separately, a stirrer 101 rotatively mounted within the reactor mixes the water and acid thoroughly. Flour is added slowly to the acidulated water while the stirrer is rotating. In this manner, a thorough mixture is made, such as a slurry, etc. By admitting live steam via steam line 102 directly into the mixture within the reactor, the temperature can be raised to about 165° F. More flour is then added slowly while the stirrer continues to rotate and to mix the entire mass. After the required amount of flour has been added, the temperature is raised to 212° F. or above by the continued introduction of live steam into the reactor. Under usual conditions, the first and second heating periods vary from about 15 minutes to about 30 minutes, preferably about 20 minutes. During these heating periods, the mixture is first thickened or jelled, then carried to the critical breaking or breakdown point and finally liquefied.

After the selected and controlled conversion of carbohydrates and proteins, cold water is then added to the heat-treated mass. The water may contain an alkaline agent or the latter may be added separately. It is preferred to use C. P. sodium bicarbonate as the alkaline agent and to employ a sufficient amount to adjust the pH to about 6.5. Of course, other reagents may be added to the mixture, such as lecithin, as those skilled in the art will readily understand.

From the reactor, the mixture is homogenized in a viscolizer 103 under pressure, preferably about 500 pounds per square inch. After thorough homogenizing, the mixture is first pumped by pump 104 to a supply tank 105 and then is pumped by pump 106 to a suitable spray dryer 107 via a centrifugal spray head 108. The sprayed material is dried by hot air at about 400° F. coming from indirect heater 109 which is supplied with clean air by fan 110 in an air filter room 111. The hot dried powder is cooled by means of cooler 112 provided with air by a powder cooling fan 113 likewise located in said air filter room. Spent air coming from the drying chamber of the spray dryer and having a temperature of about 200° F. is sent to an exhaust stack 114 via a dynamic collector 115 which removes any remaining powder in the air and collects it at the bottom of the collector. The collected powder can be removed in any appropriate manner as by means of a rotary valve 116.

The spray dried product falling through cooling duct 117 at the bottom of the spray dryer is cooled to a desired extent. Satisfactory results have been obtained by cooling to about room temperature. The cooled product can be handled in any suitable manner, but is preferably removed via a rotary valve 116. After removal, the powder is preferably screened on screen 118 and is then packed in barrels 119 or other suitable containers, such as drums. These filled barrels, etc., may be weighed on scale 120 and are then ready for shipment or for storage in a warehouse.

For the purpose of giving those skilled in the art a better understanding of the invention and a better appreciation of the advantages of the invention, the following illustrative examples are given:

EXAMPLE NO. I

In one example, the following ingredients were used in amounts listed in the following schedule:

| Ingredient: | Weight, pounds |
| --- | --- |
| Wheat flour | 100 |
| Water | 140 |
| Acid (concentrated) | 2 |

The acid, preferably hydrochloric, is dissolved in the water and the flour is gradually mixed in stirring to form a mixture. Live steam is then turned on from a steam coil at the bottom of the tank and a temperature of about 215° F. to about 260° F. is reached in about 20 to about 30 minutes during which time the slurry begins to thicken and jell. At a certain critical point, there is a sudden breakdown or breaking of the gel and the material becomes liquid or liquefies. The heat is kept up for an additional period of from about one-half to about one hour. The mixture is then neutralized by stirring in bicarbonate of soda dissolved in a minimum amount of water or in a solid form until the acidity reaches a pH of about 5, 6.5, or slightly under 7.

For certain drying operations, it is sometimes preferable to have the material somewhat on the alkaline side which means above 7. Five pounds of lecithin is then mixed in and the whole is then preferably sent to a mixing machine, homogenizer, viscolizer, votator, etc.

The mixed homogenized mass goes to the spray dryer. The material is homogenized at from about 1000 to 5000 pounds' pressure depending on the thickness and temperature of the slurry. In this particular case, approximately 3400 pounds' pressure was used, liquid temperature of about 130° F. was reached, and solids of 40% were present.. At the spray dryer, the furnace air may range from about 300° F. to about 600° F., cabinet temperature about 200° F. Temperature and time of spraying depend on the amount of moisture desired to be left in the final product which is in powder form.

EXAMPLE NO. II

In a second example, the ingredients listed in thhe following schedule were employed in the amounts noted:

| Ingredient: | Weight, pounds |
| --- | --- |
| Wheat flour | 100 |
| Water | 144 |
| HCl acid (concentrated) | 2 |

The flour was mixed into acidulated water to form a mixture. This mixture was subjected to treatment with live steam which performed a dual function of heating and stirring due to the turbulent action. The heating was continued to effect thickening and jelling of the material, a critical breaking or breakdown, a liquefying and finally additional treatment. Ammonia was used to neutralize the treated mass and about seven pounds were required to produce a pH of about 7. By subjecting the neutralized mass to a mixing or homogenizing treatment, substantial uniformity was effected. The mixed homogenized mass was then put through the operation of spray drying and a whitish or creamy colored powder was produced.

EXAMPLE NO. III

The same procedure was followed as outlined in the foregoing example with the following ingredients and amounts:

| Ingredient: | Weight, pounds |
| --- | --- |
| Wheat flour | 150 |
| Water | 200 |
| HCl acid (concentrated) | 3 |

EXAMPLE NO. IV

About 140 pounds of water were acidified with about three pounds of HCl acid (concentrated) to produce acidified water. About 100 pounds of wheat flour was mixed in this water and a slurry was made. Live steam was used to heat the slurry for about 20 to about 22 minutes at a temperature of about 215° F. to about 220° F. whereby the mass was first thickened and jelled, then brought to the critical breakdown point and subsequently liquefied and heated additionally. About 7.2 pounds of sodium bicarbonate were used to neutralize the acid and to produce a pH of about 6.9 as measured on an electric meter. The neutralized mass was then spray dried. The product was a light fluffy powder of light cream color and excellent appearance and feel.

EXAMPLE NO. V

Water was acidified with C. P. concentrated sulfuric acid. After acidifying the water, flour was added and mixed thoroughly to form a slurry. This slurry was placed in a pressure cooker and cooked for about two hours at about 15 pounds per square inch (gauge) steam pressure (about 250° F.). Cooking first effected thickening and jelling, then brought the mass to the critical breakdown point, followed by liquefying the mass, and finally added heating. After cooking, the mass was removed from the cooker and was cooled. In this condition, the pH of the material was about 1.90.

The proportions used in the foregoing operations were the following:

| Ingredient: | Weight, pounds |
| --- | --- |
| Wheat flour | 200 |
| Water | 300 |
| $H_2SO_4$ (concentrated) | 3 |

For the purpose of neutralizing, calcium carbonate was used. Slight heating was employed to aid the action between the acid and the carbonate. The pH was about 4.9 but a spot test indicated neutral to methyl orange indicator.

The neutralized material is then spray dried to produce a light fluffy powder. Such powder can be packed and used as a baking specialty.

EXAMPLE NO. VI

The same procedure as employed in Example No. V was used except syrupy phosphoric acid (concentrated) replaced sulfuric acid. The following proportions were used:

| Ingredient: | Weight, pounds |
| --- | --- |
| Wheat flour | 200 |
| Water | 300 |
| $H_3PO_4$ (syrupy) | 6 |

The mass was cooked for about four hours instead of two, but the same steam pressure was applied. At this stage, the pH of the acid mass was about 2.65. The final pH was adjusted to 5.0 by neutralizing with ammonium hydroxide solution.

Spray drying can be applied to the neutralized mass and a dried product produced. This product can be packed in any appropriate manner, such as in drums, and used by bakers as a baking specialty in making baked goods, such as bread, rolls, etc.

EXAMPLE NO. VII

The procedure of Example No. V was again employed, but concentrated hydrochloric acid was used instead of concentrated sulfuric acid. The proportions were the following:

| Ingredient: | Weight, pounds |
|---|---|
| Wheat flour | 400 |
| Water | 600 |
| HCl (concentrated) | 8 |

The cooked mass had a pH of about 2.3 which was then adjusted to about 5.9 by adding sodium hydroxide. Addition agents, such as lecithin, mono-calcium phosphate, etc., can be incorporated in the mass before drying.

As mentioned hereinbefore, spray drying was used to convert the neutralized mass into a dried product. This product can be incorporated in a bread formula as a baking specialty to produce improved baked goods.

EXAMPLE NO. VIII

The operations and proportions utilized in Example No. VIII were employed except that cornmeal was used in place of flour. The pH of the mass removed from the cooker was about 1.8. After neutralizing with sodium hydroxide, the pH was changed to about 6.85.

After spray drying, a dried product was produced. Such a product can be used as a baking specialty in a bread formula to produce baked goods. Usually about 2% of the dried product is used based on the weight of the flour in the bread formula.

EXAMPLE NO. IX

To about 870 pounds of water are added about 40 pounds of C. P. concentrated hydrochloric acid, thoroughly mixed and added to about 390 pounds of wheat flour slowly with the mixer running. The slurry of flour and acidified water is heated to about 165° F. and about 610 pounds of wheat flour is added and mixed, then heated with live steam to about 200° F. through open coils at the bottom of the tank. The slurry thickens and jells. At a certain critical point, there is a sudden breakdown of the gel and the material becomes liquid or liquefies. At this point, samples are taken for testing to determine the ratio of dextrins to sugars produced and steam may be discontinued or continued for some little time thereafter until an approximate ratio of two of dextrin to one of sugars is achieved. About 110 pounds of water is then added and is thoroughly mixed in. About 35 pounds of bicarbonate of soda is poured in a slow stream into the slurry while stirring until the pH acidity reaches about 6.5. The product is then pumped into a votator for homogenizing and thence into a spray dryer from which it emerges in a fine dry powder, ready for packing and use.

Instead of wheat flour, certain other foodstuff material or mixtures containing both carbohydrate and protein substances can be used. Generally stated, at least 60% of carbohydrate and at least 8% of protein must be present in foodstuff or mixture. As a general rule, the carbohydrate content can be present from about 65% to about 75% and the protein content from about 10% to about 20%. For example, a cereal of the group consisting of corn, rye, or barley may be used, or a mixture of a root or tuber of the group consisting of sweet or white potato, taro, sago, manioca and tapioca in combination with a legume of the group consisting of navy beans, peas, lentils, and soya beans, or any mixtures of any of the foregoing in order to provide a foodstuff material containing both protein or carbohydrate. The compositions of these materials as officially given by the U. S. Department of Agriculture in Circular 549 entitled "Proximate Composition of American Food Materials" by Chatfield and Adams are as follows:

| Foodstuff | Carbohydrate | Protein | Moisture |
|---|---|---|---|
| | Percent | Percent | Percent |
| Wheat | 72.4 | 13.0 | 11.0 |
| Corn | 73.4 | 10.0 | 11.0 |
| Rye | 75.2 | 11.2 | 10.0 |
| Barley | 72.8 | 12.8 | 10.2 |
| Rice: | | | |
|   Brown | 77.7 | 7.5 | 12.0 |
|   White | 79.4 | 7.6 | 12.3 |
| Buckwheat | 71.6 | 12.4 | 12.0 |
| Beans | 62.1 | 22.0 | 10.5 |
| Peas | 60.2 | 23.8 | 11.6 |
| Lentils | 59.9 | 24.7 | 11.2 |
| Soyabeans | 12.0 | 34.9 | 7.5 |
| Potatoes: | | | |
|   Sweet | 27.9 | 1.8 | 68.5 |
|   White | 19.1 | 2.0 | 77.8 |
|   Flour | 80.0 | 8.5 | 7.0 |
| Taro | 21.5 | 2.0 | 75.1 |
| Sago | 83.9 | 0.9 | 14.6 |
| Manioca and Tapioca | 86.4 | 0.6 | 12.6 |

In using mixtures of the foregoing, for instance, a blend of about six parts of wheat to about one part of soyabeans would give about 62% carbohydrates and about 13% protein and another example is rice and soyabeans in mixture of about 6:1 in which case the carbohydrates would be about 70% and the protein about 11.4%. In this manner, raw materials are provided containing substantial amounts of protein and carbohydrates for conversion either in one foodstuff or in a combination of foodstuffs. It is preferred to use foodstuffs or mixtures thereof containing about 70% to about 75% of carbohydrates and about 10% to about 15% of protein.

It was found that the novel dried products contained sugars, modified starches, and modified proteins. Thus, the products embodying the present invention showed the following analysis:

*Approximate analysis of new products*

| Item | Amount, Percent |
|---|---|
| Moisture | 3.5 to 5.5. |
| Total Solids | 94.5 to 96.5. |
| Soluble Solids | 82.0 to 86.0. |
| Total Proteins | 11.8 to 12.5. |
| Soluble Proteins (Polypeptides) | 6.5 to 8.9. |
| Unaltered Starch | None. |
| Soluble Starch (Modified Starch) | 9.0 to 10.0. |
| Dextrins | 35.0 to 40.0. |
| Sugars (Maltose, invert) | 18.0 to 24.0. |

The ratio of the dextrins to sugars in the new products is about one and one-half or two to about one, i. e., about 1½:1 or about 2:1.

The present baking specialty is particularly applicable to leavened goods, such as bread, rolls and sweet-dough goods which utilize yeast as a leavening agent. As those skilled in the art know, the improved baking specialty can be used in a well-known manner without departing from conventional procedures or altering the baking formulas used by bakers. Due to the fluffiness and fineness of the baking specialty and due to its characteristics of being practically all water soluble, the dispersion is very thorough and substantially complete throughout the mass of dough. Its use as a dough conditioner in small amounts, 1 to 2%, constitutes an additive and not a component part of the baking formula. As a dough conditioner, the new product activates the growth of yeast, furnishing it nutrition, accelerates the formation of gas, mellows the gluten of the added flour of the dough, increases fermentation to shorten the time, causes the dough to rise better, retain gas better, hydrate better and increase its plastic properties, leading finally to a bread or baked goods of better volume, improved platability, aspect, texture and grain of crumb, lightness and good color. The bread has the advantages of remaining fresh longer, the interior remaining softer and the crust tending to dry less, than in the bread made without the new product.

It is to be noted that the present invention is not to be confused with prior processes such as the dextrinization of starch or carbohydrates or the aminofication of proteins, etc., as for example, the production of sugars or dextrin from stach alone or substances essentially starch in character and the production of amino acids from proteins alone or substances essentially protein in character.

Other products used for baking specialties have been products of the dry conversion of starch or starchy foodstuffs, the result of so-called fringe or threshold hydrolysis, which produced dextrins, dextrinized starch esters, acetic esters of starch, gelatinized starch with little or no modification of any protein constituent when or if present.

There has been no attempt to modify both starch and protein constituents of a foodstuff or a mixture of foodstuffs which is not primarily composed of one or the other of these elements but which holds substantial amounts of both so that both are simultaneously acted upon, altered from their original insoluble and indigestible condition to a soluble, materially altered or modified form, to produce certain desirable characteristics and properties in a baking specialty.

The distinguishing character of the present invention is that it is a wet process of hydrolysis of both starches and proteins beyond the fringe or threshold stage as contrasted with the dry conversion of starch in the Block, Bright, Schenk, Lenders, and Bauer patents (U. S. Nos. 1,733,574; 1,411,203; 1,411,192; 1,391,065; and 2,197,784, respectively) and not carried to complete hydrolysis as in the conventional conversion of starches to glucose, but involves intermediate stages of hydrolysis in which the starch cells are disintegrated, their cell structure destroyed and altered to produce approximately 10% modified or soluble starch
38% dextrins
18% sugars The inherent enzymes or amylases in the foodstuff raw material act during the first stage of the process in which the temperature is gradually increased to change starch to maltose and dextrin and at the second stage where the temperature is carried beyond the breakdown point to obtain a greater proportion of dextrin than maltose by reason of the conversion and/or destruction of the amylases.

At the same time in the presence of the hydrochloric acid, changes are being brought about in the original complex insoluble indigestible proteins, of which in the case of wheat, gliadin and glutenin are major constituents, resulting in depolymerization and peptinization and peptinization in the formation of intermediate derivatives short of amino-acid production.

In the Bauer patent, the "Protamyline" product employed therein is a cereal flour partially dextrinized by dry conversion, as stated in the wording of the patent itself, and this "Protamyline" is so converted that the gluten content is acted upon sufficiently to increase its extensibility but insufficiently to destroy its elasticity. The present invention destroys all the characteristics of gluten (the protein of wheat), extensibility, elasticity, etc. There is no longer any gluten as such. In other words, the new product is devoid or substantially free from gluten.

It is likewise to be noted that the present invention uses a water-white acid which is non-oxidizing as specified hereinbefore. Oxidizing acids, such as nitric acid which is used in a prior process disclosed in U. S. Patent No. 2,223,387, are not employed in the present process. As is well known to those skilled in the art, the use of nitric acid on protein-containing materials, such as contemplated in the aforesaid patent, produced products containing nitrates, nitrites and xantho-proteins. Such constituents are not present in the product produced by the improved process described hereinbefore.

Comparative baking tests were made using the new product which demonstrated that the latter produced new and improved results. Data obtained from baking tests demonstrated the meritorious nature of the new product. The following schedules are based upon some of the data and show the new results:

*Schedules of comparative baking tests*

WHITE BREAD

| Formula | Control Product | New Product |
| --- | --- | --- |
| Flour_____gms__ | 600 | 600 |
| Water_____cc__ | 475 | 475 |
| Yeast_____gms__ | 25 | 25 |
| Yeast food_____gms__ | 2.5 | 2.5 |
| Temperature_____° F__ | 80 | 80 |
| Made | 9:25 | 10:25 |
| Flour_____gms__ | 400 | 400 |
| Water_____cc__ | 240 | 250 |
| Nonfat milk solids__gms__ | 40 | 40 |
| Salt_____gms__ | 22.5 | 22.5 |
| Sugar_____gms__ | 40 | 40 |
| Shortening_____gms__ | 40 | 40 |
| Malt_____gms__ | 5 | 5 |
| New Product___gms__ | | 10 |
| Remixed | 1:25 | 2:25 |
| Taken | 1:55 | 2:55 |
| Moulded | 2:25 | 3:25 |
| Into oven | 3:10 | 4:10 |
| Out of oven | 3:38 | 4:38 |

BREAD SCORES

| | Control Product | New Product |
| --- | --- | --- |
| Symmetry | 4.37 | 4.37 |
| Bloom | 4.37 | 4.54 |
| Color of crust | 4.37 | 4.54 |
| Volume | 4.37 | 4.54 |
| Consistency of crust | 4.37 | 4.37 |
| Color of crumb | 8.75 | 8.75 |
| Grain | 8.75 | 8.90 |
| Texture | 13.13 | 14.06 |
| Aroma | 8.75 | 8.75 |
| Flavor | 17.52 | 17.52 |
| Eating quality | 8.75 | 9.06 |
| Total score | 87.50 | 89.40 |
| pH value | 5.50 | 5.52 |

SHEARING TEST

| Degrees, MacMichael: | | |
| --- | --- | --- |
| After 24 hours | 225 | 220 |
| After 48 hours | 240 | 215 |
| After 72 hours | 330 | 250 |

COMPRESSIBILITY

| Stress, gms | 15.0 | 15.0 |
| --- | --- | --- |
| Strain, mm: | | |
| After 24 hours | 2.5 | 3.5 |
| After 48 hours | 1.4 | 1.5 |
| After 72 hours | 1.3 | 1.5 |

Further comparative baking tests on a regular bakery scale likewise confirmed the meritorious nature of the new product and the improved and new results produced thereby. The following schedule discloses data obtained from these plant scale tests:

*Schedule of comparative baking tests*

| Sponge Bakes | Color | Bread Score | Loaf Volume | Water Absorption | Softness After— 24 hr. | Softness After— 36 hr. |
|---|---|---|---|---|---|---|
| | | | | Percent | | |
| 1% New Product added | [1] 99.0 CW | 90.5 | 44.75 | 65 | 2d | 2d |
| ½% Commercial bread softener added | 99.5 CW | 90.0 | 44.25 | 65 | 1st | 1st |
| Control (nothing added) | 99.5 CW | 90.0 | 44.75 | 65 | 4th | 5th |

[1] CW = cream white.

The comparative bake tests conducted on a plant scale show that the breads containing ½% commercial bread softener were chosen as the softest bread in every case. This choice was for softness only and not for bread qualities. It was found that the dough containing commercial bread softener produced the softest bread but the crumb structure was weak and gummy when compared with the controls and with the one containing the new product. The softer breads made with the new product retained a firmness of crumb that is desirable for slicing, while the breads made with commercial bread softener lacked this quality due to the weak and gummy character of the crumb. The doughs containing the new product retained their freshness and softness, quite noticeably over the control breads, for a considerable length of time.

The present application is a continuation-in-part of my co-pending application, Serial No. 86,002, filed April 7, 1949, now abandoned.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. The wet process of producing a water-soluble, edible baking specialty containing derivatives of wheat flour including sugars and adapted to be added in the amount of about 2% to leavened goods and to be dispersed completely throughout the mass of dough which comprises stirring about 100 to about 400 parts by weight of a wheat flour composed substantially completely of carbohydrates and proteins in about 140 to about 600 parts, respectively, by weight of water acidified with about 2 to about 8 parts by weight of a specially selected water white, non-toxic, non-oxidizing, non-discoloring and ionizable acid of the inorganic group consisting of hydrochloric acid, sulfuric acid, and phosphoric acid to form an acid wet mixture, said wet mixture containing an amount of water greater than the amount of wheat flour; heating said wet mixture in a first stage with live steam at a temperature within a range of about 220° F. to about 250° F. to stir, moisten and heat said wet mixture until the same is converted to a thickened and jelled mass; continuing to heat said thickened and jelled mass in a second stage with said live steam at a temperature within said range until a sudden critical and visible breakdown occurs in said thickened and jelled mass; further heating said mass in a third stage with said live steam at a temperature within said range beyond the said critical breakdown point to form a liquefied mass of acid character; treating said liquefied mass with a chemically pure alkaline agent of the group consisting of ammonium, sodium, potassium, and calcium products capable of producing only non-toxic, inert and non-deleterious by-products to neutralize sufficient acid in said liquefied mass to bring the pH within a range of about 5 to about 7; homogenizing the thus-treated liquefied mass under pressure of about 1,000 to about 5,000 pounds to produce a substantially uniform mass; and spray drying said homogenized mass at a temperature within a range of about 300° F. to about 600° F. to produce a whitish or creamy colored powder having fluffiness and fineness and capable of being packed, shipped, stored, handled, and used as an edible baking specialty in the manufacture of leavened baked goods including bread, rolls, and sweet-dough goods.

2. The wet process of producing a water-soluble baking specialty containing derivatives of wheat flour including sugars and adapted to be added in a small amount to leavened goods and to be dispersed completely throughout the mass of dough which comprises forming a wet mixture of wheat flour composed substantially completely of carbohydrates and proteins and water in the proportion of about one and one-third to about one and one-half parts by weight of water to every one part of wheat flour; said water being acidified with a very small amount within a range of about 1% to about 5% of a specially selected water white, non-toxic, non-oxidizing, non-discoloring and ionizable acid of the inorganic group consisting of hydrochloric acid, sulfuric acid, and phosphoric acid; heating while mixing and moistening said wet mixture at a temperature more than about 210° F. and up to about 300° F. for a period of time to first convert the same to a thickened and jelled mass, then to cause a sudden critical and visible breakdown in said thickened and jelled mass, and finally to form a liquefied mass of acid character thereby carrying the conversion beyond the point of mere dextrinization and to the formation of some sugar; treating said liquefied mass with a chemically pure alkaline agent of the group consisting of ammonium, sodium, potassium and calcium products capable of producing only non-toxic, inert and non-deleterious by-products to neutralize sufficient acid in said liquefied mass to bring the pH within a range of about 5 to about 7; mixing said liquefied mass to produce a substantially uniform mass; and drying said uniform mass at a temperature within a range of about 300° F. to about 600° F. to produce a whitish or creamy colored powder having a fluffiness and fineness and capable of being packed, shipped, stored, handled, and used as a baking specialty in the manufacture of leavened baked goods including bread, rolls, and sweet-dough goods.

3. The wet process of producing an edible, water-soluble baking specialty containing derivatives of cereal flour including sugars and adapted to be added in a small amount to leavened goods and to be dispersed completely throughout the mass of dough which comprises mixing a cereal flour of the group consisting of wheat, corn, rye, barley, rice, and buckwheat and composed substantially wholly of carbohydrates and proteins and water in the proportion of about one to about one and one-half parts by weight of water to every one part by weight of cereal flour to form a wet mixture; said water being acidified with an amount of about 1% to about 10% of a specially selected water white, non-toxic, non-oxidizing, non-discoloring and ionizable acid of the inorganic group consisting of hydrochloric acid, sulfuric acid, and phosphoric acid; heating said wet mixture with live steam at a selected temperature within a range of about 220° F. to about 260° F. until a thickened and jelled mass is formed; continuing said heating of said thickened and jelled mixture with said live steam within said temperature until a sudden critical and visible breakdown occurs in said thickened and jelled mixture and then until said mixture is converted to a liquefied mass of acid character; adding a chemically pure alkaline agent of the group consisting of ammonium, sodium, potassium and calcium products capable of producing only non-toxic, inert and non-deleterious by-products to said liquefied mass to neutralize sufficient acid to bring the pH within a range of about 5 to about 7; homogenizing the thus-treated liquefied mass to produce a substantially uniform mass; and drying said homogenized uniform mass at a temperature of about 300° F. to about 600° F. to produce a whitish or creamy colored powder having fluffiness and fineness and being capable of being packed, shipped, stored, handled, and used as an edible baking specialty in the manufacture of leavened baked goods including bread, rolls, and sweet-dough goods.

4. The wet process of producing a water-soluble baking specialty containing derivatives of cereal flour including sugars and adapted to be added in a small amount to leavened goods and to be dispersed completely throughout the mass of dough which comprises stirring a cereal flour of the group consisting of wheat, corn, rye, barley, rice, and buckwheat composed substantially wholly of carbohydrates and proteins in water acidified with an amount of about 1% to about 10% by weight of a specially selected water white, non-toxic, non-oxidizing, non-discoloring and ionizable acid of the inorganic group consisting of hydrochloric acid, sulfuric acid, and phosphoric acid to form a wet mixture of the group consisting of a slurry, thin batter and dough, said wet mixture containing water and cereal flour in proportion of about one and one-third to about one and one-half parts by weight of the former to every one part by weight of the latter; subjecting said wet mixture to live steam at a selected temperature within a range of about 220° F. to about 300° F. for a period of time to first convert the same to a thickened and jelled mass, then to cause a sudden critical and visible breakdown in said thickened and jelled mass, and finally to form a liquefied mass with a chemically pure alkaline agent of the group consisting of ammonium, sodium, potassium, and calcium products capable of producing only non-toxic, inert and non-deleterious by-products to neutralize sufficient acid to bring the pH within a range of about 5 to about 7; mixing the thus-treated liquefied mass to produce a substantially uniform mass; and drying said uniform mass at a temperature within a range of about 300° F. to about 600° F. to produce a whitish or creamy colored powder having a fluffiness and fineness and capable of being packed, shipped, stored, handled and used as an edible baking specialty in the manufacture of leavened baked goods including bread, rolls, and sweet-dough goods.

5. The wet process of producing an edible, water-soluble baking specialty containing derivatives of a farinaceous foodstuff including sugars and adapted to be added in a small amount to leavened goods and to be dispersed completely throughout the mass of dough which comprises forming a wet mixture of a farinaceous foodstuff of the group consisting of wheat, corn, rye, barley, rice, and buckwheat composed principally of carbohydrates and proteins and water acidified with a very small amount of a specially selected water white, non-toxic, non-oxidizing, non-discoloring and ionizable acid of the inorganic group consisting of hydrochloric acid, sulfuric acid, and phosphoric acid, said wet mixture having water present in the proportion of about one and one-third to about one and one-half parts by weight of water to about every one part of farinaceous foodstuff; subjecting said wet mixture to the action of live steam under a pressure of about 10 pounds per square inch to about 50 pounds per square inch for a period of time to first convert the said wet mixture containing said farinaceous foodstuff to a thickened and jelled mass, then to cause a sudden critical and visible breakdown in said thickened and jelled mass, and finally to form a liquefied mass of acid character therefrom; adding to said liquefied mass of acid character a chemically pure alkaline agent of the group consisting of ammonium, sodium, potassium and calcium products capable of producing only non-toxic, inert and non-deleterious by-products to reduce the acidity of said liquefied mass and to adjust the pH within a range of about 5 to about 8; and drying said thus-treated mass at a temperature within a range of about 300° F. to about 600° F. to produce a whitish or creamy colored powder having a fluffiness and fineness and capable of being packed, shipped, stored, handled and used as a baking specialty in the manufacture of leavened baked goods including bread, rolls, and sweet-dough goods.

6. In the wet process of producing an edible, water-soluble baking specialty containing derivatives of farinaceous foodstuff including sugars and adapted to be added in very small amounts to leavened goods and to be dispersed completely throughout the mass of dough, that improvement which comprises heating a wet mixture of a farinaceous foodstuff of the group consisting of wheat, corn, rye, barley, rice, and buckwheat composed principally of carbohydrates and proteins and water containing a small amount of a specially selected colorless, non-toxic, non-oxidizing, non-discoloring and ionizable acid of the inorganic group consisting of hydrochloric acid, sulfuric acid, and phosphoric acid, said wet mixture having water present in proportion of about one and one-third to about one and one-half parts by weight to about every one part by weight of farinaceous foodstuff; continuing said heating while mixing at a temperature of about 220° F. to about 300° F. for a sufficient period of time to first convert the said mixture containing a farinaceous foodstuff to a thickened and jelled mass, then to cause a sudden critical and visible breakdown in said thickened and jelled mass, and finally to form a liquefied mass of acid character therefrom; adding to said acid mass a chemically pure alkaline agent of the group consisting of ammonium, sodium, potassium, and calcium products capable of producing only non-toxic, inert, and non-deleterious by-products to reduce the acidity of said acid mass and to adjust the pH to a value within a range of about 5 to about 7; and drying the thus-treated mass at a temperature within a range of about 300° F. to about 600° F. to produce a whitish or creamy colored powder having fluffiness and fineness and capable of being packed, shipped, stored, handled and used as a baking specialty in the manufacture of leavened baked goods including bread, rolls, and sweet-dough goods.

7. The wet process of producing a baking specialty containing derivatives of foodstuffs of farinaceous type and adapted to be dispersed as an additive dough conditioner in small amounts completely throughout a mass of dough which comprises acidifying water with a very small amount of a specially selected acid of the group consisting of hydrochloric acid, sulfuric acid, and phosphoric acid; forming a wet mixture with ground foodstuff of farinaceous type composed of carbohydrates and proteins and more than an equal weight of water; subjecting said wet mixture to controlled heating at specially selected temperatures above the boiling point to effect a thickening and jelling and to produce a thickened and jelled mass; continuing said controlled heating until said thickened and jelled mass reaches a breakdown point; further continuing said controlled heating beyond said breakdown point to produce a heated and liquefied mass of acid character thereby effecting hydrolysis of both starches and proteins beyond the threshold stage and to intermediate stages without going to completion; neutralizing said liquefied mass with a chemically pure alkaline agent capable of producing only non-toxic, inert and non-deleterious by-products to bring the mass to as nearly neutral as possible where the pH is close to the neutral point; and drying said neutralized mass to produce a dried product which is composed of practically all soluble solids substantially devoid of gluten and of unaltered starch and containing modified starches, modified proteins, dextrins, and sugars, the ratio of dextrins and sugars being about 1½:1 to about 2:1, and which is capable of being packed, shipped, stored, handled and used as a baking specialty in the manufacture of baked goods including bread and rolls.

8. The wet process of producing a baking specialty containing derivatives of foodstuffs of farinaceous type and adapted to be dispersed as an additive dough conditioner in small amounts completely throughout a mass of dough which comprises acidifying water with a very small amount of a specially selected acid of the group consisting of hydrochloric acid, sulfuric acid, and phosphoric acid; limiting the amount of said acid to less than about 5% by weight of water acidified; forming a wet mixture with ground foodstuff of farinaceous type composed of carbohydrates and proteins and at least an equal weight of said acidified water; subjecting said wet mixture to controlled heating at specially selected temperatures of about 100° F. to about 300° F. to effect a thickening and jelling and to produce a thickened and jelled mass; continuing said controlled heating until said thickened and jelled mass reaches a breakdown point; further continuing said controlled heating beyond said breakdown point to produce a heated and liquefied mass of acid character thereby effecting hydrolysis of both starches and proteins beyond the threshold stage and to intermediate stages without going to completion; neutralizing said liquefied mass with a chemically pure alkaline agent capable of producing only non-toxic, inert and non-deleterious by-products to bring the mass to as nearly neutral as possible where the pH is close to the neutral point and is within a range of about 5 to 7; and drying said neutralized mass to produce a dried product which is composed of practically all soluble solids substantially devoid of gluten and of unaltered starch and containing modified starches, modified proteins, dextrins, and sugars, the ratio of dextrins and sugars being about 1½:1 to about 2:1 and which is capable of being packed, shipped, stored, handled and used as a baking specialty in the manufacture of baked goods including bread and rolls.

9. The wet process of producing a baking specialty containing derivatives of foodstuffs including farinaceous cereals and adapted to be dispersed as an additive dough conditioner in small amounts completely throughout a mass of dough which comprises acidifying water with a very small amount of about 1% to about 5% by weight of a specially selected acid of the group consisting of hydrochloric acid, sulfuric acid, and phosphoric acid; forming a wet mixture with ground foodstuff of farinaceous type composed of carbohydrates and proteins and a greater weight of said acidified water; subjecting said wet mixture to controlled direct steam heating at specially selected pressures of about 10 to about 50 pounds per square inch to heat said mixture and to subject the same to turbulent mixing in order to effect a thickening and jelling and to produce a thickened and jelled mass; continuing said controlled direct steam heating until said thickened and jelled mass reaches a breakdown point; further continuing said controlled direct steam heating beyond said breakdown point to produce a heated and liquefied mass of acid character and to subject the same to turbulent mixing thereby effecting hydrolysis of both starches and proteins beyond the threshold stage and to intermediate stages without going to completion; neutralizing said liquefied mass with a chemically pure alkaline agent of the group consisting of ammonium, sodium, potassium and calcium products capable of producing only non-toxic, inert and non-deleterious by-products to bring the mass to as nearly neutral as possible; adjusting the pH to within a range of about 5 to 7; and spray drying said neutralized mass at a temperature of several hundred degrees Farenheit to produce a dried product in the form of a powder which is composed of practically all soluble solids substantially devoid of gluten and of unaltered starch and containing modified starches, modified proteins, dextrins, and sugars, the ratio of dextrins and sugars being about 1½:1 to about 2:1, and which is capable of being packed, shipped, stored, handled and used as a baking specialty in the manufacture of baked goods including bread and rolls.

10. The wet process of producing a baking specialty containing derivatives of foodstuffs of farinaceous type and adapted to be dispersed as an additive dough conditioner in small amounts completely throughout a mass of dough which comprises acidifying water with a very small amount of about 1% to about 5% by weight of a specially selected acid of the group consisting of hydrochloric acid, sulfuric acid, and phosphoric acid; forming a wet mixture with ground fodstuff of farinaceous type composed of carbohydrates and proteins and a greater weight of said acidified water; subjecting said wet mixture to controlled direct steam heating at specially selected pressures of about 10 to about 50 pounds per square inch to heat said mixture and to subject the same to turbulent mixing in order to effect a thickening and jelling and to produce a thickened and jelled mass; continuing said controlled direct steam heating until said thickened and jelled mass reaches a breakdown point; further continuing said controlled direct steam heating beyond said breakdown point to produce a heated and liquefied mass of acid character and to subject the same to turbulent mixing thereby effecting hydrolysis of both starches and proteins beyond the threshold stage and to intermediate stages without going to completion; neutralizing said liquefied mass with a chemically pure alkaline agent of the group consisting of ammonium, sodium, potassium, and calcium products capable of producing only non-toxic, inert and non-deleterious by-products to bring the mass to as nearly neutral as possible; adjusting the pH within a range of about 5 to 7; homogenizing said neutralized mass to produce a substantially uniform homogenized mass; and spray drying said homogenized and neutralized mass at a temperature of several hundred degrees Fahrenheit to produce a dried product in the form of a powder which is composed of practically all soluble solids substantially devoid of gluten and of unaltered starch and containing modified starches, modified proteins, dextrins, and sugars, the ratio of dextrins and sugars being about 1½:1 to about 2:1, and which is capable of being packed, shipped, stored, handled and used as a baking specialty in the manufacture of baked goods including bread and rolls.

11. The wet process of producing a baking specialty containing derivatives of foodstuffs including farinaceous cereals and adapted to be dispersed as an additive dough conditioner in small amounts completely through a mass of dough which comprises acidifying water with a substantially water white, non-oxidizing acid which is non-toxic, which is ionizable, which does not discolor the foodstuffs and which yields derivatives which are edible and non-harmful; mixing a cereal flour composed of carbohydrates and proteins with at least an equal weight of said acidified water to form a wet mixture; controlled heating of said wet mixture at selected temperatures above the boiling point to thicken and jell said mixture; continuing said controlled heating of said thickened and jelled mixture to the critical breakdown point; further heating said mixture beyond the critical breakdown point to liquefy said mixture to form a liquefied mass of acid character thereby effecting hydrolysis of both starches and proteins beyond the threshold stage and to intermediate stages without going to completion; treating said liquefied mass with a chemically pure neutralizing agent capable of producing only non-toxic, inert and non-deleterious by-products to reduce the acidity and bring the pH near the neutral point; and drying said neutralized mass to produce a dried product which is composed of practically all soluble solids substantially devoid of gluten and of unaltered starch and containing modified starches, modified proteins, dextrins, and sugars, the ratio of dextrins and sugars being about 1½:1 to about 2:1, and which can be used as a baking specialty.

12. The wet process of producing a baking specialty containing derivatives of farinaceous cereals and adapted to be dispersed as an additive dough conditioner in small amounts completely throughout a mass of dough which comprises acidifying water with a substantially water white, concentrated and chemically pure acid which is non-toxic, which is ionizable, which does not discolor the foodstuffs and which yields derivatives which are edible and non-harmful; mixing a farinaceous cereal flour composed mainly of carbohydrates and proteins with a greater weight of said acidified water to form a wet mixture; controlled direct steam heating said water mixture at selected temperatures of not less than about one hundred degrees and not more than several hundred degrees Fahrenheit to thicken and jell said mixture; continuing said controlled direct steam heating of said thickened and jelled mixture to the critical breakdown point; further direct steam heating said mixture beyond the critical breakdown point to liquefy said mixture to form a liquefied mass of acid character thereby effecting hydrolysis of both starches and proteins beyond the threshold stage and to intermediate stages without going to completion; treating said liquefied mass with a chemically pure neutralizing agent capable of producing only non-toxic, inert and non-deleterious by-products to reduce the acidity and bring the pH near the neutral point; and drying said neutralized mass at not more than several hundred degrees Fahrenheit to produce a dried product which is composed of practically all soluble solids substantially devoid of gluten and of unaltered starch and containing modified starches, modified proteins, dextrins, and sugars, the ratio of dextrins and sugars being about 1½:1 to about 2:1, and which can be used as a baking specialty capable of being added to dough to act as a baked goods improver, softener and a moisture absorber and retainer.

13. The wet process of producing a baking specialty containing derivatives of farinaceous cereals and adapted to be dispersed as an additive dough conditioner in small amounts completely throughout a mass of dough which comprises acidifying water with a substantially water white, non-oxidizing acid which is non-toxic, which is ionizable, which does not discolor the foodstuffs, and which yields derivatives which are edible and non-harmful; mixing a cereal flour composed of at least 60% carbohydrates and at least 8% proteins with said acidified water to form a wet mixture, said wet mixture having water present in proportion of about one and one-third to about one and one-half parts by weight to about every one part by weight of farinaceous-like foodstuffs; controlled heating of said water mixture at selected temperatures above the boiling point to thicken and jell said mixture; continuing said controlled heating of said thickened and jelled mixture to the critical breakdown point; further heating said mixture beyond the critical breakdown point to liquefy said mixture to form a liquefied mass of acid character thereby effecting hydrolysis of both starches and proteins beyond the threshold stage and to intermediate stages without going to completion; treating said liquefied mass with a chemically pure neutralizing agent capable of producing only non-toxic, inert and non-deleterious by-products to reduce the acidity and bring the pH near the neutral point; adding addition agents to said neutralized mass; and drying said neutralized mass to produce a dried product which is composed of practically all soluble solids substantially devoid of gluten and of unaltered starch and containing modified starches, modified proteins, dextrins, and sugars, the ratio of dextrins and sugars being about 1½:1 to about 2:1 and which can be used as a baking specialty.

14. The wet process of producing a baking specialty containing derivatives of foodstuffs including farinaceous cereals and adapted to be dispersed as an additive dough conditioner in small amounts completely throughout a mass of dough which comprises treating ground foodstuff composed of about 65% to about 75% carbohydrates and about 10% to about 20% proteins with water acidified with a small amount of a substantially water white acid which is non-toxic, which is ionizable, which does not discolor the foodstuffs, and which yields derivatives which are edible and non-harmful to form a wet mixture, said wet mixture having water present in proportion of about one and one-third to about one and one-half parts by weight to about every one part by weight of farinaceous-like foodstuffs; heating said wet mixture to specially selected temperatures of about one hundred degrees and up to several hundred degrees Fahrenheit to effect a thickening and jelling and to produce a thickened and jelled mass; continuing said heating until said thickened and jelled mass reaches a breakdown point; further continuing said heating beyond said breakdown point to produce a heated and liquefied mass of acid character thereby effecting hydrolysis of both starches and proteins beyond the threshold stage and to intermediate stages without going to completion; neutralizing said liquefied mass with a chemically pure alkaline agent capable of producing only non-toxic, inert and non-deleterious by-products to bring the mass to as nearly neutral as possible where the pH is close to the neutral point; and drying said neutralized mass to produce a dried product which is composed of practically all soluble solids substantially devoid of gluten and of unaltered starch and containing modified starches, modified proteins, dextrins, and sugars, the ratio of dextrins and sugars being about 1½:1 to about 2:1, and which is capable of being packed, shipped, stored, handled and used as a baking specialty in the manufacture of baked goods including bread and rolls.

15. The wet process of producing a baking specialty containing derivatives of farinaceous cereals and adapted to be dispersed as an additive dough conditioner in small amounts completely throughout a mass of dough which comprises gradually stirring a cereal flour composed of about 70% to about 75% carbohydrates and about 10% to about 15% proteins in water acidified with a very small amount of a specially selected acid of the group consisting of hydrochloric acid, sulfuric acid, and phosphoric acid to form a wet mixture, said wet mixture having water present in proportion of about one and one-third to about one and one-half parts by weight to about every one part by weight of farinaceous-like foodstuffs; subjecting said wet mixture to direct live steam at selected temperatures of about one hundred degrees and up to several hundred degrees Fahrenheit to stir and heat said mixture to thicken and jell the same; continuing subjecting said thickened and jelled mixture to the action of said direct live steam heating until a sudden critical breakdown occurs; further heating said mixture with direct live steam beyond the critical breakdown to liquefy said mixture to form a liquefied mass of acid character thereby effecting hydrolysis of both starches and proteins beyond the threshold stage and to intermediate stages without going to completion; treating said liquefied mass with a chemically pure neutralizing agent of the group consisting of ammonium, sodium, potassium and calcium products capable of producing only non-toxic, inert and non-deleterious by-products to reduce the acidity and bring the pH to near the neutral point; homogenizing said neutralized and liquefied mass under pressure up to several thousand pounds to produce a substantially uniform mass; and spray drying said homogenized mass at selected temperatures up to several hundred degrees Fahrenheit to produce a whitish or creamy colored powder which possesses fluffiness and fineness, which is composed of practically all soluble solids substantially devoid of gluten and of unaltered starch and containing modified starches, modified proteins, dextrins, and sugars, the ratio of dextrins and sugars being about 1½:1 to about 2:1, and which is capable of being used as a baking specialty.

16. As a new article of manufacture, an improved baking specialty capable of being added as an additive dough conditioner in small amounts to conventional baking formulas for the production of leavened goods to be baked and capable of being dispersed very thoroughly and substantially completely throughout a mass of dough due to the fluffiness, fineness, and water soluble nature of the whitish powder to act as a baked goods improver and softener and a moisture absorber and retainer which comprises derivatives of foodstuffs including farinaceous cereals composed mainly of carbohydrates and proteins hydrolyzed to intermediate stages and containing a small amount of moisture and being constituted of practically all water soluble solids being substantially neutral and containing about 3% to about 5% of moisture, about 35% to about 40% dextrins, and about 18% to about 24% total sugars and being substantially devoid of gluten, unaltered starch, esters, nitrates, nitrites and xantho-proteins, the ratio of dextrins to sugars being about 1½:1 to about 2:1.

17. As a new article of manufacture, an improved baking specialty capable of being added as an additive dough conditioner in small amounts to conventional baking formulas for the production of leavened goods to be baked and capable of being dispersed very thoroughly and substantially completely throughout a mass of dough due to the fluffiness, fineness, and water soluble nature of the whitish powder to act as a baked goods improver and softener and a moisture absorber and retainer which comprises derivatives of foodstuffs of farinaceous type composed mainly of carbohydrates and proteins hydrolyzed to intermediate stages and containing a small amount of moisture and being constituted of practically all water soluble solids being substantially neutral and containing up to about 5% moisture and up to about 24% total sugars and being substantially devoid of gluten, unaltered starch, esters, nitrates, nitrites and xantho-proteins.

18. As a new article of manufacture, an improved baking specialty capable of being added as an additive dough conditioner in small amounts to conventional baking formulas for the production of leavened goods to be baked and capable of being dispersed very thoroughly and substantially completely throughout a mass of dough due to the fluffiness, fineness, and water soluble nature of the whitish powder to act as a baked goods improver and softener and a moisture absorber and retainer comprising derivatives of farinaceous-like foodstuffs composed mainly of carbohydrates and proteins hydrolyzed to intermediate stages and containing a small amount of moisture and being devoid of gluten, unaltered starch, esters, nitrates, nitrites and xantho-proteins and constituted of practically all water soluble solids being substantially neutral and having approximately the following composition:

| | |
|---|---|
| Moisture | About 3.5% to about 5.5%. |
| Total solids | About 94.5% to about 96.5%. |
| Soluble solids | About 82.0% to about 86.0%. |
| Total modified proteins | About 11.8% to about 12.5%. |
| Soluble modified proteins | About 6.5% to about 8.9%. |
| Unaltered starch | None. |
| Unaltered protein | None. |
| Soluble modified starches | About 9.0% to about 10.0%. |
| Dextrins | About 35.5% to about 40.0%. |
| Sugars | About 18.0% to about 24.0%. |

References Cited in the file of this patent

UNITED STATES PATENTS

| | | |
|---|---|---|
| 1,391,065 | Lenders | Sept. 20, 1921 |
| 1,411,192 | Schenk | Mar. 28, 1922 |
| 1,411,203 | Bright | Mar. 28, 1922 |
| 1,560,045 | Dunlap | Nov. 3, 1925 |
| 1,733,574 | Block | Oct. 29, 1929 |
| 1,892,076 | Rabinowitsch | Dec. 27, 1932 |
| 1,974,915 | Giesecke | Sept. 25, 1934 |
| 2,197,784 | Bauer | Apr. 23, 1940 |
| 2,223,387 | Scalise | Dec. 3, 1940 |

OTHER REFERENCES

Federal Register, vol. 15, No. 152, August 8, 1950, pages 5104, 5110 and 5111.